(12) United States Patent
Yacoub et al.

(10) Patent No.: US 8,687,792 B2
(45) Date of Patent: Apr. 1, 2014

(54) SYSTEM AND METHOD FOR DIALOG MANAGEMENT WITHIN A CALL HANDLING SYSTEM

(75) Inventors: Sherif Yacoub, Sant Cugat del Valles (ES); Roland John Burns, Sant Cugat des Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 3102 days.

(21) Appl. No.: 10/830,599

(22) Filed: Apr. 22, 2004

(65) Prior Publication Data

US 2005/0238161 A1 Oct. 27, 2005

(51) Int. Cl.
*H04M 3/00* (2006.01)
*H04M 5/00* (2006.01)

(52) U.S. Cl.
USPC ............. 379/265.06; 379/265.01; 379/265.02

(58) Field of Classification Search
USPC ............... 379/88.01, 266.07, 265.01, 265.02, 379/265.03, 265.04, 265.05, 265.06, 379/265.07, 265.08, 265.09, 265.1, 265.11, 379/265.12, 265.13, 265.14, 266.01, 379/266.02, 266.03, 266.04, 266.05, 379/266.06, 266.08, 266.09, 266.1; 704/270

See application file for complete search history.

(56) References Cited

U.S. PATENT DOCUMENTS

| | | | |
|---|---|---|---|
| 4,041,617 A * | 8/1977 | Hollander | 434/237 |
| 5,946,375 A | 8/1999 | Pattison et al. | |
| 6,353,810 B1 | 3/2002 | Petrushin | |
| 6,466,663 B1 | 10/2002 | Ravenscroft et al. | |
| 6,490,350 B2 | 12/2002 | McDuff et al. | |
| 6,542,602 B1 | 4/2003 | Elazar | |
| 6,724,887 B1 * | 4/2004 | Eilbacher et al. | 379/265.03 |
| 6,754,626 B2 * | 6/2004 | Epstein | 704/235 |
| 2002/0123925 A1 | 9/2002 | Smith | |
| 2002/0194002 A1 * | 12/2002 | Petrushin | 704/270 |
| 2003/0048893 A1 | 3/2003 | McIllwaine et al. | |
| 2003/0055654 A1 | 3/2003 | Oudeyer | |
| 2003/0178977 A1 | 9/2003 | Wu | |
| 2003/0179877 A1 * | 9/2003 | Dezonno et al. | 379/266.07 |
| 2004/0062363 A1 * | 4/2004 | Shambaugh et al. | 379/88.01 |
| 2004/0249634 A1 * | 12/2004 | Degani et al. | 704/207 |

FOREIGN PATENT DOCUMENTS

| | | |
|---|---|---|
| EP | 1256937 | 11/2002 |
| WO | WO0062279 | 10/2000 |

OTHER PUBLICATIONS

Sherif Yacoub—"Two-Engine Speech Recognition"—Pending U.S. Appl. No. 10/354,415, filed Jan. 30, 2003.
Steven J. Simske et al—"Email Application With User Voice Interface"—Pending U.S. Appl. No. 10/715,179, filed Nov. 17, 2003.
Xiaofan Lin et al—"System and Method for Language Variation Guided Operator Selection"—Pending U.S. Appl. No. 10/769,240, filed Jan. 30, 2004.

(Continued)

*Primary Examiner* — Khai N Nguyen

(57) ABSTRACT

Dialog management within a call handling system includes monitoring a dialog between a contact and an operator. A first dialog attribute confidence score is generated based on an acoustical analysis of the dialog, and a second dialog attribute confidence score is generated based on a keyword analysis of the dialog. The first and second dialog attribute scores are combined, and a rule is effected in response to a value of the combined dialog attribute score.

27 Claims, 5 Drawing Sheets

(56) References Cited

OTHER PUBLICATIONS

Xiaofan Lin—"Commerical Automatic Speech Recognition Engine Combinations"—Pending U.S. Appl. No. 10/339,423, filed Jan. 16, 2003.

Sherif Yacoub et al—"System and Method for Prioritizing Contacts"—Pending U.S. Appl. No. 10/776,569, filed Feb. 11, 2004.

Sherif Yacoub et al—"Recognition of Emotions in Interactive Voice Response Systems"—Eurospeech 2003—Sep. 2003/HPL-2003-136.

* cited by examiner

Fig. 2

SYSTEM AND METHOD FOR DIALOG MANAGEMENT WITHIN A CALL HANDLING SYSTEM

CROSS-REFERENCE TO RELATED OR CO-PENDING APPLICATIONS

This application relates to co-pending U.S. patent application Ser. No. 10/676,995, entitled "System And Method For Operator Assisted Automated Call Handling," filed on Sep. 30, 2003, by Xiaofan Lin; U.S. patent Ser. No. 10/776,569, entitled "System And Method For Prioritizing Contacts," filed on Feb. 11, 2004, by Yacoub et al.; U.S. patent Ser. No. 10/338,584, entitled "Methods and Systems for Organizing Electronic Documents," filed on Jan. 7, 2003, by Steven J. Simske; U.S. patent Ser. No. 10/354,415, entitled "Two Engine Speech Recognition," filed on Jan. 30, 2003, by Sherif Yacoub; and U.S. patent Ser. No. 10/339,423, entitled "Commercial Automatic Speech Recognition Engine Combinations," filed on Jan. 9, 2003, by Xiaofan Lin. These related applications are commonly assigned to Hewlett-Packard Development Co. of Houston, Tex.

BACKGROUND OF THE INVENTION

1. Field of the Invention

The present invention relates generally to systems and methods for call handling, and more particularly to dialog management within a call handling system.

2. Discussion of Background Art

Automated call handling systems, such as Interactive Voice Response (IVR) systems, using Automatic Speech Recognition (ASR) and Text-to-speech (TTS) software are increasingly important tools for providing information and services to contacts in a more cost efficient manner. IVR systems are typically hosted by call centers that enable contacts to interact with corporate databases and services over a telephone using a combination of voice speech signals and telephone button presses. IVR systems are particularly cost effective when a large number of contacts require data or services that are very similar in nature, such as banking account checking, ticket reservations, etc., and thus can be handled in an automated manner often providing a substantial cost savings due to a need for fewer human operators.

However, whenever human operators interact with callers, the dialog between the operator and caller (i.e. contact) may from time to time evolve in an undesirable direction. The operator's mood may change over the time of the call, or over the work day, and the operator may lose their temper due to social or psychological issues. Such effects often have a negative influence on the caller's experience with the call handling system.

Some current techniques touch on this problem. They include: systems which modify "scripts" presented to the operator; detection of emotions in speech signals use acoustic features; using survey-based techniques to train operators in proper behavior; monitoring call number, volume, and distribution in call centers; and manually recording and playing back randomly selected calls. None of these systems however provide the operator or the operator's supervisors with much warning or control when such call begin to or have degraded.

In response to the concerns discussed above, what is needed is a system and method for dialog management that overcomes the problems of the prior art.

SUMMARY OF THE INVENTION

The present invention is a system and method for dialog management within a call handling system. The method of the present invention includes the elements of: initiating a dialog between a contact and an operator; monitoring a dialog attribute; presenting an instantaneous value of the dialog attribute on an operator display; and effecting a dialog rule in response to a value of the dialog attribute. The system of the present invention, includes all means for implementing the method.

These and other aspects of the invention will be recognized by those skilled in the art upon review of the detailed description, drawings, and claims set forth below.

BRIEF DESCRIPTION OF THE DRAWINGS

FIG. 2 is a pictorial diagram of one embodiment of information presented on a display within the system;

DETAILED DESCRIPTION OF THE PREFERRED EMBODIMENT

The present invention automatically monitors, facilitates, and provides real-time assistance to a dialog between a contact and a call center operator. A predetermined set of dialog attributes from both the contact and operator are monitored, such as the dialog's emotional content, duration, subject matter, and so on. Monitoring is effected using a plurality of classifiers including acoustic and keyword classifiers. Dialog data is collected both instantaneously and historically. The dialog's attributes are then compared to a predetermined set of thresholds, and actions are taken and alerts are generated if the dialog attribute is incompliant with the threshold. Actions and alerts include supervisory notification, pop-up messages on displays, flagging the dialog for later analysis, and evaluation of operator performance.

Figure 1:
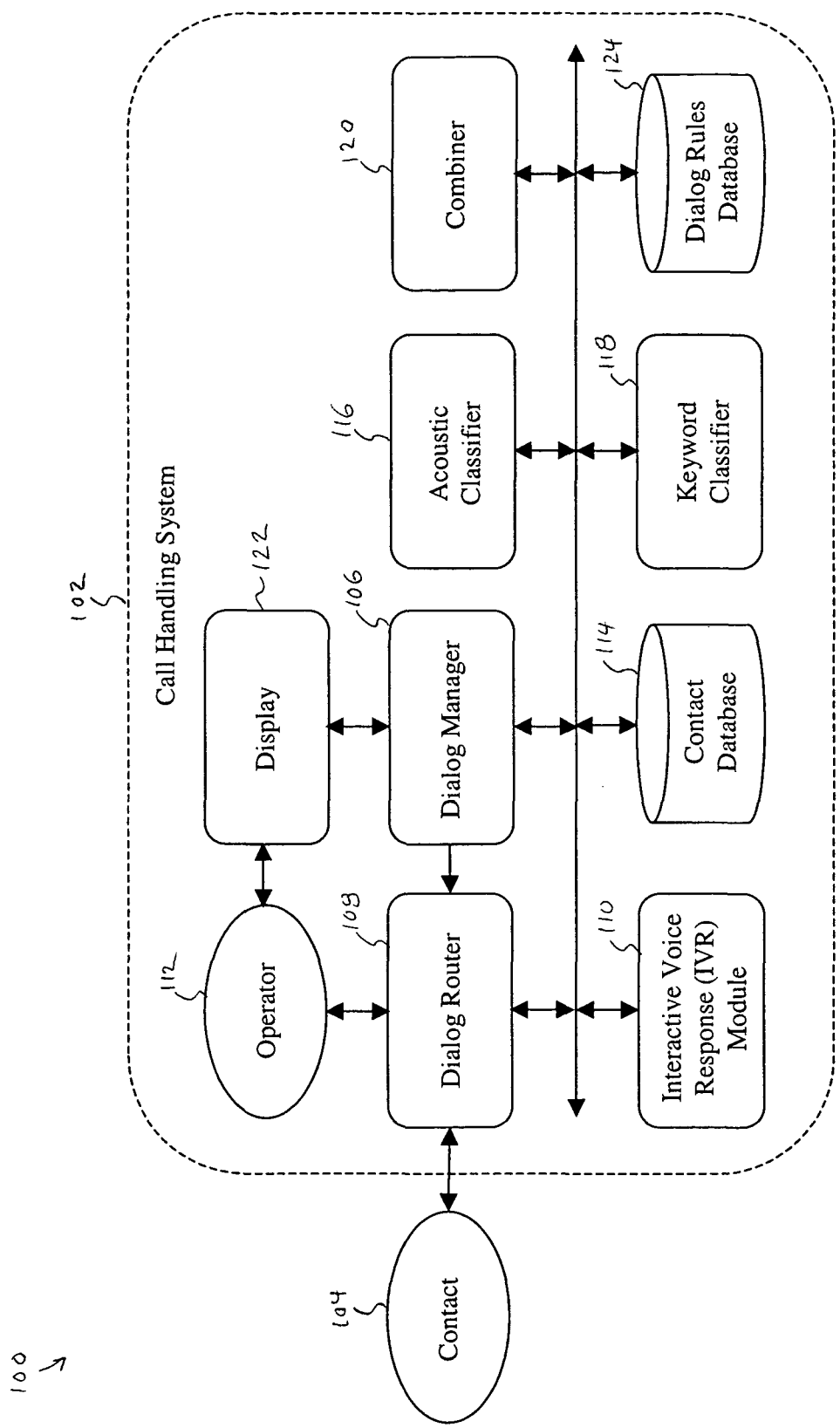
FIG. 1 is a dataflow diagram of one embodiment of a system for dialog management within a call handling system.

FIG. 1 is a dataflow diagram 100 of one embodiment of a system for dialog management within a call handling system 102. The call handling system 102 preferably provides some type of voice interactive information management service to a set of contacts. Anticipated information services include those associated with customer response centers, enterprise help desks, business generation and marketing functions, competitive intelligence methods, as well as many others. Contacts may be customers, employees, or any party in need of the call handling system's services. Also while the discussion below is sometimes discussed with respect to only one contact, the invention's functionality is intended to extend to a set of contacts.

To begin, a contact 104 establishes a communications link with the call handling system 102. A dialog manager 106 acknowledges the communications link and in response connects the contact 104 through a dialog router 108 to a recipient. The recipient can be either an Interactive Voice Response (IVR) module 110 or an operator 112, depending upon how the system 102 is designed to service the contact 104. A dialog his herein preferably defined to include communications between the contact 104 and either the IVR module 110 or the operator 112. While the present invention is described with reference to a dialog including mostly speech signals, alternate embodiments can have dialogs which are mostly textual messages, such as e-mail. Also, in alternate embodiments, the contact 104 could be an entity within the system 102 as well, such as another operator, or a manager.

The IVR module 110 provides an automated interface between the contact's 104 speech signals and the system's 102 overall functionality. To support such an interface with the contact 104, the IVR module 110 includes a Text-To-Speech (TTS) translator, Natural Language Processing (NLP) algorithms, Automated Speech Recognition (ASR), and various other dialog interpretation (e.g. a Voice-XML interpreter) tools.

The IVR module 110 typically receives information requests and responses from the contact 104 during the dialog which are then used to either look-up with a system database (not shown) or to store information with respect to the contact 104 in a contact database 114.

After the dialog has progressed to a predetermined point the dialog manager 106 connects the contact 104 with the operator 114, if the contact 104 had previously been connected to the IVR module 110.

The discussion now to follow describes how the system 102 calculates a set of dialog attribute confidence scores ("p"), for each dialog attribute being monitored by the system 102, using various classifiers. Each classifier generates a different set of confidence scores each having a probability score ("p") where p=1.0 represents a highest probability and p=0.0 represents a lowest probability.

During this discussion an emotional dialog attribute, such as "anger" is repeatedly used as an instance of the present invention's operation. However, those skilled in the art will recognize that these same techniques can be applied toward identifying any emotion within the dialog, such as sadness, boredom, happiness, hot anger, cold anger, frustration, panic and calmness. Those skilled in the art will recognize that the same techniques can be applied toward monitoring and identifying any other dialog attribute, such as dialog subject matter, or how quickly the dialog is completed.

The system 102 preferably calculates these confidence scores using one or more well known techniques, such as those employing Neural Networks, Support Vector Machines, K-NNs, Gaussian Mixture Models (GMMS), decision trees, and other classifiers.

Preferably, the contact's 102 and operator's 112 dialog attributes are monitored separately and have separate dialog attribute confidence scores. This enables the system 102 to distinguish between the contact's 104 attributes and the operator's 112 attributes.

Also, the system 102 preferably monitors the dialog in parallel with and independently from any other call center application or operation 114 interaction with the contact 104.

Acoustic Classifier

An acoustic classifier 116 extracts a predetermined set of speech features from both the contact's 104 and operator's 112 portions of the dialog. The feature set used by the acoustic classifier 116 may include: pitch contour statistics, contour statistics of the first derivative of the pitch, energy contour statistics, contour statistics of the first derivative of the energy, and audible and inaudible duration features. These features may also include cepstral-based and phoneme-based derivatives, having variable cepstral-length and phoneme-length windows.

The acoustic classifier 116 generates a dialog attribute confidence score ("p") using known techniques by which certain acoustic features in the dialog are associated with certain dialog attributes, such as the contact's 104 or operator's 112 anger level. A ground truth confusion matrix is used to help assign otherwise similar acoustic features to the appropriate dialog attribute, thereby increasing the dialog attribute confidence score's accuracy.

In addition, the acoustic classifier 116 may statistically correlate phonetic features extracted from the dialog and with phonetic features from a known set of keywords. The acoustic classifier 116 generates a second dialog attribute confidence score indicative of how well the dialog correlates with keywords associated with the dialog attribute. For example, if the dialog attribute selected for monitoring is both the contact's 104 and operator's 112 anger level, the acoustic classifier 116 compares acoustic features within the dialog between the contact 104 and the operator 112 with certain acoustically similar keywords associated with anger, such as "horrible", "unacceptable", and the like. Keyword spotting is a well-known speech analysis technique.

Keyword Classifier

The automated speech recognition (ASR) engine within the IVR module 110 converts the dialog into text in real-time. A keyword classifier 118 searches the textual file for a predetermined set of keywords or key phrases associated with the dialog attribute to be monitored. For example, if the dialog attribute to be monitored is "anger", some of the predetermined keywords include: "awful", "unacceptable", and similar words. The set of keywords and key phrases are preferably prepared off-line and expanded using natural language processing techniques (e.g. hyponym expansion using Word-Net). The keywords are stored in a database or a look-up table. The set of keywords can also be readily adjusted to search for keywords and phrases in many other languages. Different sets of keywords may be used for the contact 104 and the operator 112, allowing a distinct anger assessment for each. For example, if the operator 112 has been a part of the call handling system 102 for sometime a more specific set of "anger" keywords can be identified which are tailored to the operator 112. However, since the contact 104 may only call from time to time, a more generic set of "anger" keywords is preferred.

The keyword classifier 118 calculates a dialog attribute confidence score based on whether the dialog includes a predetermined set and number of the keywords and key phrases. For example, if the dialog includes the keyword "awful" or its synonyms at least five times, then the dialog "anger" attribute confidence score is preferably set to a high value, such as p=0.7. Whereas, if the dialog does not include the keywords "awful", "unacceptable" or their synonyms several times, then the dialog "anger" attribute confidence score is preferably set to a low value, such as p=0.1.

However, since multiple conflicting assignments are possible (e.g. what if the user says "it's not awful?") various HMMs, Bayesian, and conditional probabilities which consider each of the words in the contact's 102 sentence are used as well. For instance, a summed dialog attribute based on all the keywords found, and their context can be used.

Other Classifiers

Those skilled in the art will recognize that other dialog attribute classification modules may also be used to generate a dialog attribute confidence scores for the contact 104 and the operator 112.

Data Combiner

A data combiner 120 retrieves each of the dialog attribute confidence scores generated by the various classifiers 116 and 118. The combiner 120 dynamically assigns a weight to each of the confidence scores depending upon the classifier from which the confidence score was received. The weighting is dynamic since the weights are constantly revised using ground truth data from the ongoing activities of the call handling system 102 and how well each of the classifiers predicted the dialog attribute for either the contact 104 or the operator 112.

The data combiner 120 calculates a combined confidence score for the dialog attribute based on all the confidence scores received from the various classifiers. The combined confidence score can be calculated in several different ways depending upon how statistically independent the different classifiers 116 and 118 are.

One calculation method uses an equal-weighted product combination. The equal weighted method equally weights and multiplies together the confidence score from each of the classifiers 116 and 118 to yield the combined confidence score.

Another calculation method is the weighted linear summation, according to the following formula:

$$S = \sum_{j=1}^{N} r_j p_j$$

where N is a total number of classifiers, r is a weight assigned to classifier j, and Pj is a confidence score generated by Classifier j)

A third calculation method is the weighted exponential, according to the following formula:

$$S = \prod_{j=1}^{N} p_j^{r_j}$$

(where N is a total number of classifiers, r is a weight assigned to classifier j, and Pj is a confidence score generated by Classifier j)

A third calculation method uses a neural net, such as Multiple Layer Perception (MLP) network, with $\{p_1, p_2, \ldots p_N\}$ as the input.

The following table presents one example of how confidence scores from the different classifiers 116 and 118 can be weighted and combined to generate a single combined confidence score for the dialog attribute. In this example, the system 102 favors dialog attribute detection (e.g. "anger" detection) from the more general portion of the acoustic classifier 116 and uses secondary information from the acoustic keyword portion of the acoustic classifier 116 and the keyword classifier 118 to fine tune the dialog attribute confidence score assignments. Preferably each classifier generates a score that complies with a common scale (e.g. ranging from 0 to 1). The weights are also chosen (e.g. 0.5, 0.25, and 0.25 respectively) so that the combined score also complies with the common scale (e.g. ranging from 0 to 1). Thus a combined score of "1" could be a mad-frustrated person and a combined score of "0" could be a normal calm person.

| Contact Information | Acoustic Classifier (×0.5) | Acoustic Keyword Classifier (×0.25) | Keyword Classifier (×0.25) | Combined Score |
|---|---|---|---|---|
| First Contact Utterance | 0.9 | 0.1 | 0.1 | 0.5 |
| First Operator Utterance | 0.1 | 0.9 | 0.5 | 0.4 |
| Second Contact Utterance | 0.8 | 0.8 | 0.8 | 0.8 |

More sophisticated confidence score combination techniques can be used as well. For instance, the call handling system 102 could use historical data from the various classifiers to train a statistical classifier (for example, a neural network, SVM, linear regression, etc.), that would then be used to classify the dialog attribute (e.g. "anger") within each portion of the utterance (e.g. speech signal) based on runtime scores generated by the classifiers 116 and 118.

Also, since some classifiers may be computationally complex, such as the keyword classifier's 118 use of Automatic Speech Recognition, the combiner 120 employs a hierarchical (i.e. staged) classifier strategy to calculate the combined dialog attribute confidence score. One embodiment of such a hierarchical strategy includes: first calculating dialog attribute confidence scores using the least computationally intensive classifier, such as the acoustic classifier 116, before employing the more computationally intensive classifiers, and stopping generation of the dialog attribute scores once the combined dialog attribute score for a dialog utterance exceeds a predetermined threshold combined confidence score.

For example, if the combined confidence score from the generic portion and the keyword portion of the acoustic classifier 116 already exceeds p=0.9, then the keyword classifier 118 analysis can be skipped. Using such a staged strategy, reduces a number of computational resources required by the system 102.

Dialog Management

The dialog manager 106 calculates and presents one or more derivations of a predetermined set of dialog attribute combined confidence scores to the operator 112 on a display 122. For example, in one embodiment, the predetermined set of dialog attribute combined confidence scores include an instantaneous value of one of the contact's 104 emotional dialog attributes, such as "anger". This one embodiment also includes the operator's 112 instantaneous anger score, as well as both the contact's 104 and operator's 112 anger scores over a period of time, such as the length of the dialog between the contact 104 and the operator 112. Instantaneous values of a confidence score refer to the confidence scores calculated for each "utterance" within the dialog. Such utterances include either the contact's 104 or operator's 112 words, sentences, and sets of sentences.

Derivations of these scores refer to various ways these scores can be modified (i.e. graphical display, chart display, % display, etc.) displayed to the operator 112. These derivations can be particularly useful to the operator 112 and during later analysis when dialog attribute trends (e.g. anger trends) over the course of a dialog or a set of separate dialogs. Trend analysis is particularly useful for assessing the quality of the dialog over a reasonable period of time and decisions based on anger trend are generally more accurate than decisions made based on one instantaneous speech signal. For instance, using trend analysis, specific parts of the dialog that frustrated the contact 104 can be isolated, as well has how the contact's 104 frustration evolved during the course of the dialog.

The dialog manager 106 accesses a predetermined set of dialog rules stored in a dialog rules database 124. The rules are preferably based on a set of best practices determined by a user of the system 102. In one embodiment the rules are classified into several categories, such as: a set of desired dialog attributes and trends; a set of preferred operator behaviors; a set of dialog efficiencies; and so on. In another embodiment, the dialog rules are logically ordered into a set of "IF" constructs and a set of "THEN" constructs which may be mapped to each other in any variety of static or dynamic ways based on best practices and ground truth data.

An exemplary set of "IF" constructs include: If a dialog is diverging to a non-call center specific topic; If an anger level in the dialog is trending up; If a contact satisfaction rule violation is detected; and, If a contact interaction rule violation is detected. An exemplary set of "THEN" constructs include: Then display a pop-up window encouraging the operator to get the conversation back on track; Then display something to the operator; Then notify other systems in the call center; Then log the call for future analysis; Then present pop-up messages to the operator; Then alert operator's supervisor about the dialog anger scores; Then present popup messages to the operator to calm him down; Then present a set of recommendations or help menu to the operator on how to deal with an angry contact; Then advise the operator exactly what to do; and Then call for or adjust operator's performance evaluation.

An exemplary set of "IF-THEN" constructs include: If an anger score detected in a contact's response exceeds 90%, notify operator's supervisor; If an anger score of an operator continues to be above 80% for three consecutive utterances, log the dialog in a database for future operator performance evaluation; If an anger level did not exceed 20% in the whole dialog, add a positive note to operator's performance evaluation; Within a same dialog, if the number of times an anger score for either the operator or the contact exceed 50%, notify operator's supervisor; and, If an anger level of the operator exceeds 70%, send a popup message to operator's display to ask him to calm down and provide suggestions for dealing with the contact.

Note that presentation of "pop-up" messages to the operator 112 on the display 122 is a particularly useful technique for providing advice to the operator 112 when a dialog attribute threshold has been exceeded. Pop-up messages can be humorous to try to get the operator 112 better mood when dealing with an angry contact. Popup messages can also be warning messages that inform the operator about their performance and that the operator's supervisor may be notified. While often pop-up messages are displayed to the operator 112 automatically by the dialog manager 106, pop-up messages are sometimes generated in response to the operator's 112 call for help. For example, if the operator 112 becomes frustrated with the contact 104 and needs advice, the operator 112 can send a request to the dialog manager 106 for help. The dialog manager 106 then temporarily lowers the dialog attribute thresholds to a current value, such as the contact's 104 instantaneous anger level, after which the dialog manager 106 provides a response as discussed above. Preferably such a response would not include operator performance type responses, since the operator 112 is asking for help.

Those skilled in the art will recognize that the teachings and suggestions of the present invention apply to any set of dialog rules and that a particular set of dialog rules used is very application dependent.

The dialog manager 106 compares a set of dialog information with the set of dialog rules. The set of dialog information includes not only the dialog attribute combined confidence scores, and derivations thereof, but also all other known information about the contact 102, the operator 112, and the applications hosted by the system 102. The dialog manager 106 identifies a sub-set of the dialog rules which the set of dialog information maps to. The dialog manager 106 effects the sub-set of dialog rules.

In one alternate embodiment, an operator's supervisor may also have a display on to which the dialog manager 106 presents a same, similar, or completely different set of information to the operator's supervisor as is presented to the operator 112. Other embodiments of the present invention include: monitoring and classifying the contact's 104 dialog attributes but not the operator's 112, such as when the contact 104 is interacting with only the IVR module 110; and monitoring and classifying the operator's 112 dialog attributes, but not the contact's 104, such as when the operator 112 is being trained.

In another alternate embodiment, the set of dialog information can be compared with the set of dialog rules off-line. Off-line includes analysis of the set of dialog information after the dialog has ended. Such off-line analysis provides not only historic operator 112 performance information, but also overall call center performance information. A percentage of good dialogs versus troubled dialogs may be used as a flag to alert the system 102 with respect to whether the call center is performing in accordance with a set predefined standards.

Figure 2:
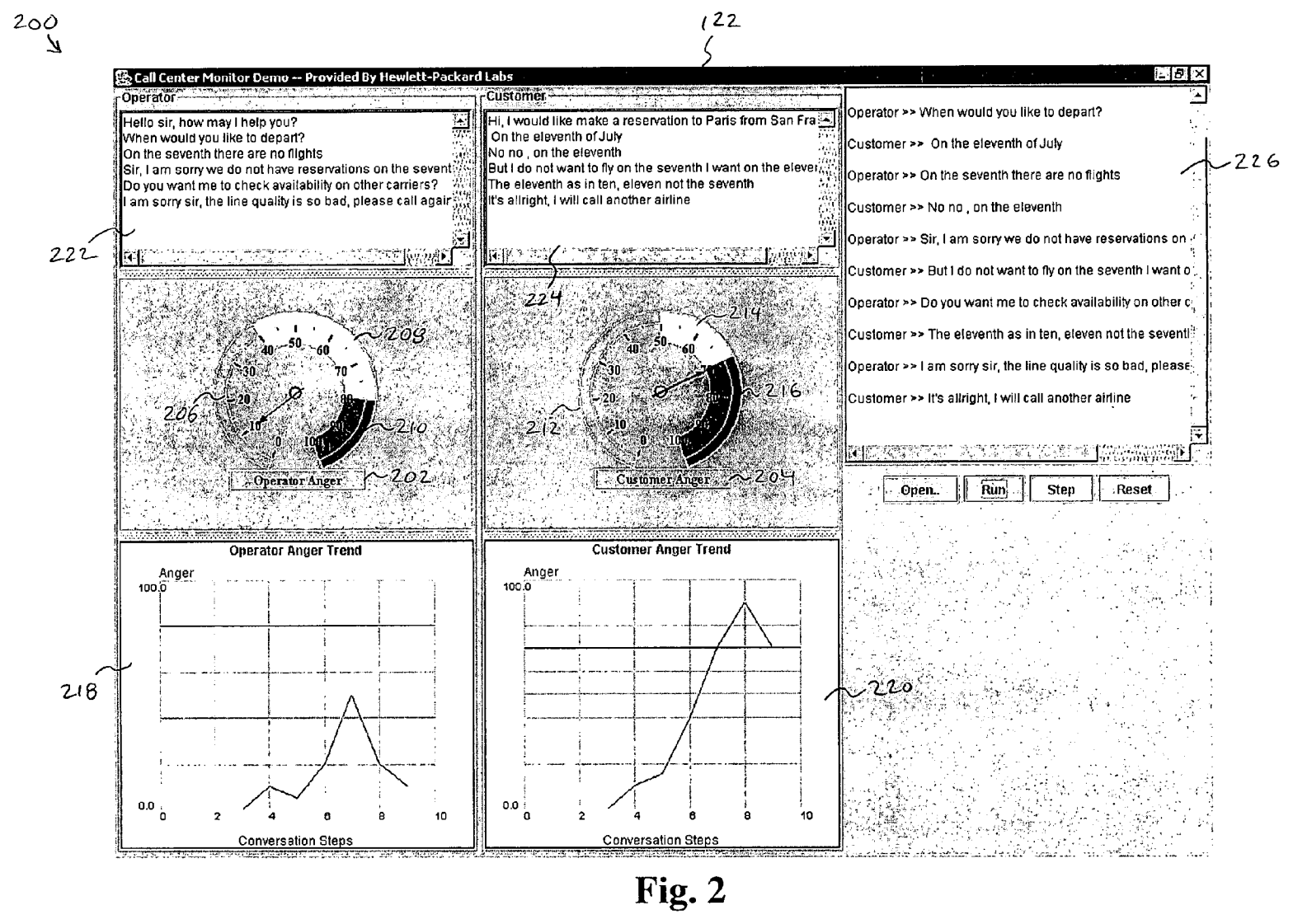

FIG. 2 is a pictorial diagram 200 of one embodiment of information presented on the display 122 within the system 102. The information presented includes an operator anger meter 202, and a customer anger meter 204. These anger meters include several meter zones. On the operator anger meter 202 there is a green zone 206 for low anger (0%-40%); a yellow zone 208 for medium anger (40-80%); and a red zone 210 for high anger levels (80-100%). On the customer anger meter 204 there is a green zone 212 for low anger (0%-50%); a yellow zone 214 for medium anger (50-70%); and a red zone 216 for high anger levels (70-100%). Note that the green, yellow, and red zones have different boundaries for the operator and the customer.

The information presented also includes an operator anger trend graph 218, a customer anger trend graph 220, an operator dialog window 222, a customer dialog window 224, and a complete dialog window 226. Those skilled in the art recognize that many other sets of information and arrangements thereof may be presented on the display 122 as well.

Figure 3:
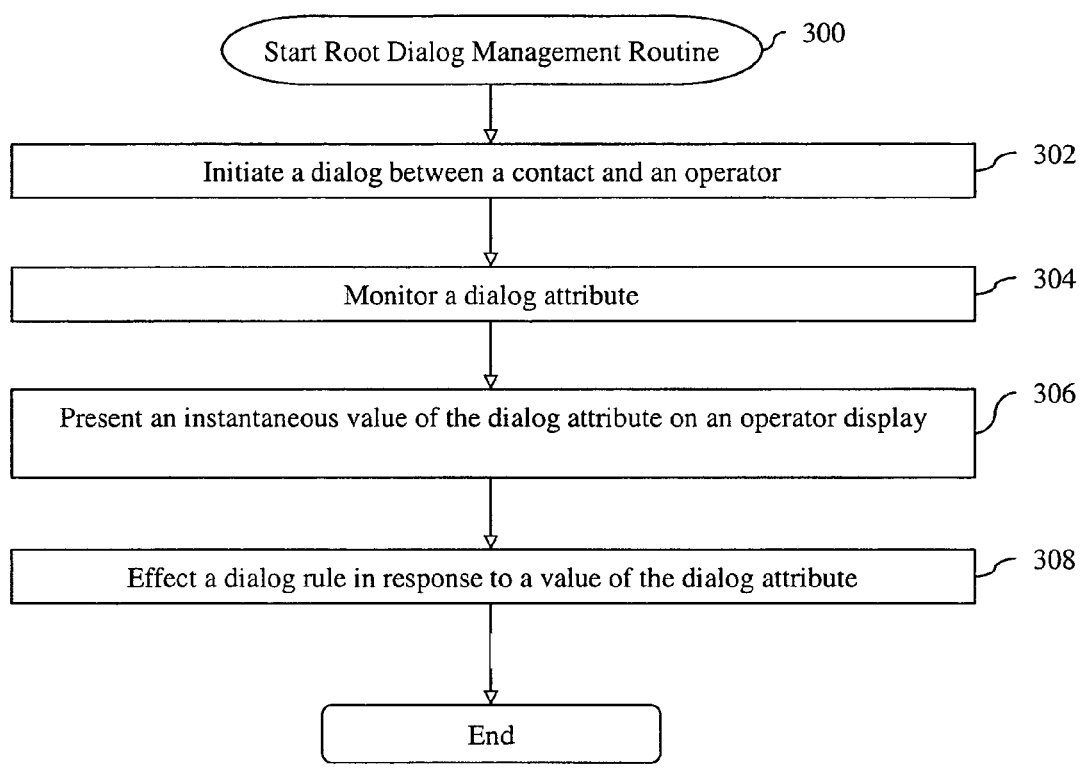
FIG. 3 is a root flowchart of one embodiment of a method for dialog management within a call handling system.

FIG. 3 is a root flowchart of one embodiment of a method 300 for dialog management within a call handling system. In step 302, a dialog is initiated between a contact and an operator. In step 304, a dialog attribute is monitored. In step 306, an instantaneous value of the dialog attribute is presented on an operator display. In step 308, a dialog rule is effected in response to a value of the dialog attribute. The root method 300 is discussed in further detail with respect to FIG. 4.

Figure 4A:
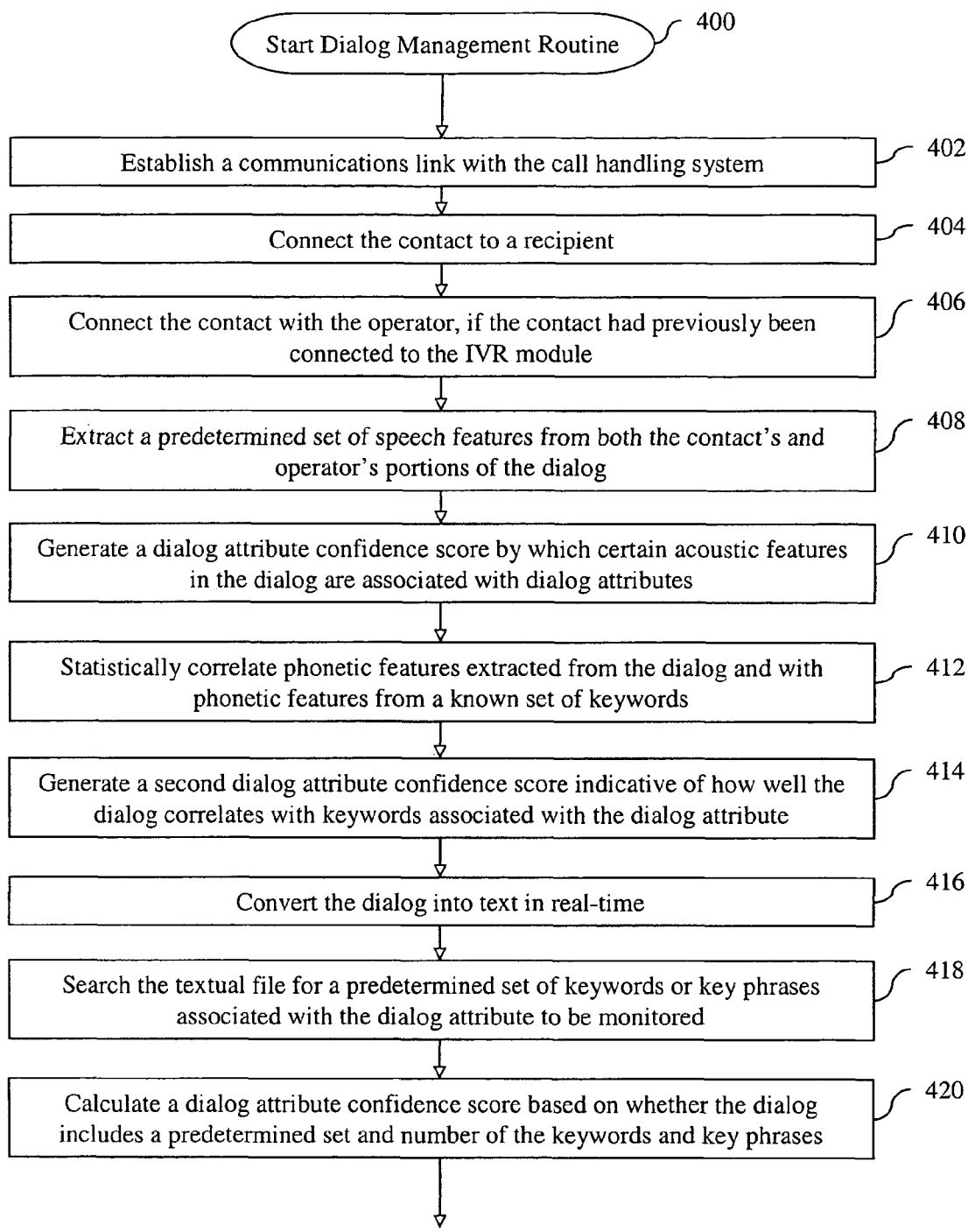
FIG. 4 is a flowchart of one embodiment of a method for dialog management within a call handling system.
Figure 4B:
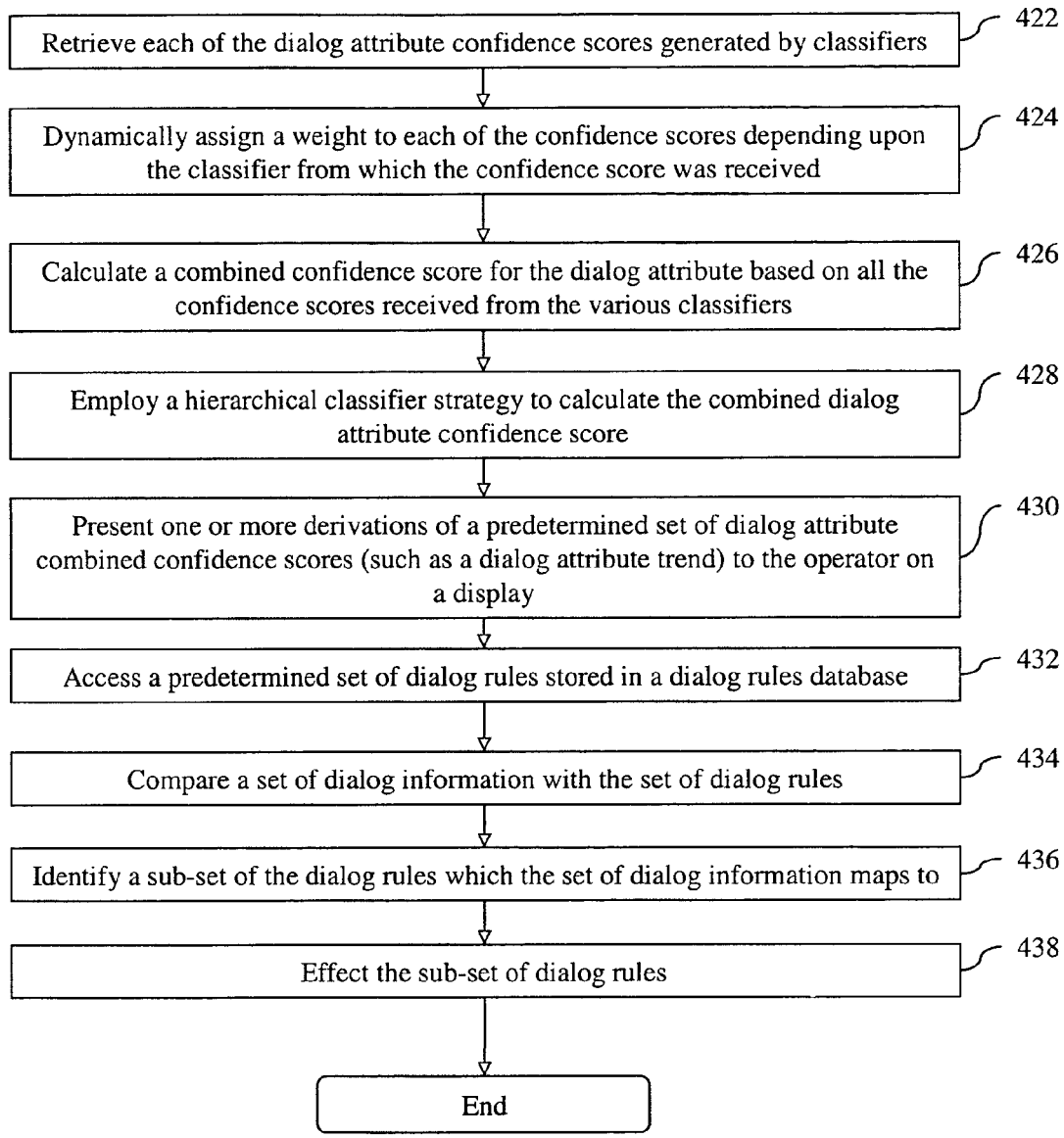

FIG. 4 is a flowchart of one embodiment of a method for dialog management within a call handling system. In step 402, a contact 104 establishes a communications link with the call handling system 102. In step 404, a dialog manager 106 acknowledges the communications link and in response connects the contact 104 through a dialog router 108 to a recipient. In step 406, after the dialog has progressed to a predetermined point the dialog manager 106 connects the contact 104 with the operator 114, if the contact 104 had previously been connected to the IVR module 110.

Acoustic Classifier

In step 408, an acoustic classifier 116 extracts a predetermined set of speech features from both the contact's 104 and operator's 112 portions of the dialog. In step 410, the acoustic classifier 116 generates a dialog attribute confidence score ("p") using known techniques by which certain acoustic features in the dialog are associated with certain dialog attributes, such as the contact's 104 or operator's 112 anger level.

In step 412, the acoustic classifier 116 statistically correlates phonetic features extracted from the dialog and with phonetic features from a known set of keywords. In step 414, the acoustic classifier 116 generates a second dialog attribute confidence score indicative of how well the dialog correlates with keywords associated with the dialog attribute.

Keyword Classifier

In step 416, the automated speech recognition (ASR) engine within the IVR module 110 converts the dialog into text in real-time. In step 418, a keyword classifier 118 searches the textual file for a predetermined set of keywords or key phrases associated with the dialog attribute to be monitored. In step 420, the keyword classifier 118 calculates a dialog attribute confidence score based on whether the dialog includes a predetermined set and number of the keywords and key phrases.

Data Combiner

In step 422, a data combiner 120 retrieves each of the dialog attribute confidence scores generated by the various classifiers 116 and 118. In step 424, the combiner 120 dynamically assigns a weight to each of the confidence scores depending upon the classifier from which the confidence score was received. In step 426, the data combiner 120 calculates a combined confidence score for the dialog attribute based on all the confidence scores received from the various classifiers. In step 428 the combiner 120 employs a hierarchical (i.e. staged) classifier strategy to calculate the combined dialog attribute confidence score.

Dialog Management

In step 430, the dialog manager 106 calculates and presents one or more derivations of a predetermined set of dialog attribute combined confidence scores (such as a dialog attribute trend) to the operator 112 on a display 122. In step 432, the dialog manager 106 accesses a predetermined set of dialog rules stored in a dialog rules database 124. In step 434, the dialog manager 106 compares a set of dialog information with the set of dialog rules. In step 436, the dialog manager 106 identifies a sub-set of the dialog rules which the set of dialog information maps to. In step 438, the dialog manager 106 effects the sub-set of dialog rules.

While one or more embodiments of the present invention have been described, those skilled in the art will recognize that various modifications may be made. Variations upon and modifications to these embodiments are provided by the present invention, which is limited only by the following claims.

What is claimed is:

1. A method for dialog management within a call handling system, comprising:
   initiating, by a computer executing machine readable instructions stored on a non-transitory computer readable medium, a dialog between a contact and an operator;
   monitoring, by the computer executing machine readable instructions stored on the non-transitory computer readable medium, dialog attributes including generating a dialog attribute score for each dialog attribute;
   presenting, by the computer executing machine readable instructions stored on the non-transitory computer readable medium, an instantaneous value of at least one of the dialog attributes on an operator display; and
   effecting, by the computer executing machine readable instructions stored on the non-transitory computer readable medium, a dialog rule in response to the dialog attribute scores;
   wherein the monitoring includes,
      identifying computational resources required to calculate each of the dialog attribute scores;
      generating dialog attribute scores hierarchically beginning with the dialog attribute score requiring a least amount of computational resources; and
      stopping generation of the dialog attribute scores once the combined dialog attribute score exceeds a predetermined threshold.

2. The method of claim 1, wherein the dialog includes an e-mail message.

3. The method of claim 1:
   wherein the dialog includes a contact portion and an operator portion; and
   wherein monitoring includes,
      monitoring a first dialog attribute within the contact portion of the dialog; and
      monitoring a second dialog attribute within the operator portion of the dialog.

4. The method of claim 1, wherein monitoring includes monitoring an emotional dialog attribute.

5. The method of claim 1, wherein monitoring includes monitoring an anger dialog attribute.

6. The method of claim 5, wherein presenting includes:
   presenting an anger meter, showing an instantaneous value of the anger dialog attribute, on the display.

7. The method of claim 6, wherein presenting includes:
   presenting a set of anger zones on the anger meter.

8. The method of claim 5, wherein presenting includes:
   presenting an anger trend graph, showing a set of historical values of the anger dialog attribute, on the display.

9. The method of claim 1, wherein monitoring includes monitoring an anger level of the contact over a predetermined time period.

10. The method of claim 1, wherein monitoring includes monitoring an anger level of the operator over a predetermined time period.

11. The method of claim 1, wherein monitoring includes monitoring a subject matter dialog attribute.

12. The method of claim 1, wherein presenting includes:
    presenting a set of historic values for the at least one dialog attribute on the display.

13. The method of claim 1, wherein presenting includes:
    presenting the dialog attributes to a supervisor of the operator on a supervisory display.

14. The method of claim 1, wherein effecting includes:
    presenting an advisory message to the operator on the display.

15. The method of claim 1, wherein effecting includes:
    alerting a supervisor of the operator.

16. The method of claim 1, wherein effecting includes:
    storing a copy of the dialog in a database for future analysis.

17. The method of claim 1, wherein effecting includes:
    evaluating each of the dialog attributes with respect to the dialog rule after the dialog has ended.

18. The method of claim 1, wherein effecting includes:
    adding a note to a performance evaluation of the operator.

19. The method of claim 1:
    further comprising, measuring a dialog attribute trend over the course of the dialog; and
    wherein effecting includes, effecting a next dialog rule in response to the dialog attribute trend.

20. The method of claim 19:
    wherein measuring includes, monitoring how an evolution of the dialog resulted in the dialog attribute reaching the instantaneous value.

21. The method of claim 19:
    wherein measuring includes, identifying a portion of the dialog which resulted in the dialog attribute reaching the instantaneous value.

22. A method for dialog management within a call handling system, comprising:
    initiating, by a computer executing machine readable instructions stored on a non-transitory computer readable medium, a dialog between a contact and an operator;

monitoring, by the computer executing machine readable instructions stored on the non-transitory computer readable medium, an anger dialog attribute and a subject matter dialog attribute;

presenting, by the computer executing machine readable instructions stored on the non-transitory computer readable medium, a representation of the anger dialog attribute and the subject matter dialog attribute;

determining a value for the anger dialog attribute and a value for the subject matter dialog attribute;

comparing the value for the anger dialog attribute and the value for the subject matter dialog attribute to a set of dialog rules;

effecting, by the computer executing machine readable instructions stored on the non-transitory computer readable medium, a dialog rule from the set of dialog rules in response to the comparison;

wherein the monitoring of the subject matter dialog attribute includes analyzing a subject matter of the dialog and generating the subject matter dialog attribute which describes the subject matter of the dialog.

23. The method of claim 22, wherein the monitoring comprises:

identifying computational resources required to calculate dialog attribute scores for a plurality of dialog attributes of the dialog;

generating dialog attribute scores hierarchically beginning with the dialog attribute score requiring a least amount of computational resources; and stopping generation of the dialog attribute scores once the combined dialog attribute score exceeds a predetermined threshold.

24. A non-transitory computer-usable medium embodying computer program code for commanding a computer to effect dialog management within a call handling system, comprising:

initiating a dialog between a contact and an operator;

monitoring an anger dialog attribute and a subject matter dialog attribute;

determining a value for the anger dialog attribute and a value for the subject matter dialog attribute;

comparing the value for the anger dialog attribute and the value for the subject matter dialog attribute to a set of dialog rules; and effecting a dialog rule from the set of dialog rules in response to the comparison;

wherein monitoring the subject matter dialog attribute includes analyzing a subject matter of the dialog and generating the subject matter dialog attribute which describes the subject matter of the dialog.

25. The non-transitory computer-usable medium of claim 24, wherein the monitoring comprises:

identifying computational resources required to calculate dialog attribute scores for a plurality of dialog attributes of the dialog;

generating dialog attribute scores hierarchically beginning with the dialog attribute score requiring a least amount of computational resources; and stopping generation of the dialog attribute scores once the combined dialog attribute score exceeds a predetermined threshold.

26. A system for dialog management within a call handling system, comprising:

a call handling system to initiate a dialog between a contact and an operator;

a monitor to monitor an anger dialog attribute and a subject matter dialog attribute, wherein the monitoring of the subject matter dialog attribute includes analyzing a subject matter of the dialog and generating the subject matter dialog attribute which describes the subject matter of the dialog; and a computer executing machine readable instructions to determine a value for the anger dialog attribute and a value for the subject matter dialog attribute;

compare the value for the anger dialog attribute and the value for the subject matter dialog attribute to a set of dialog rules; and effect a dialog rule from the set of dialog rules in response to the comparison.

27. The system of claim 26, wherein the monitor is further to:

identify computational resources required to calculate dialog attribute scores for a plurality of dialog attributes of the dialog;

generate dialog attribute scores hierarchically beginning with the dialog attribute score requiring a least amount of computational resources; and stop generation of the dialog attribute scores once the combined dialog attribute score exceeds a predetermined threshold.

* * * * *